(12) United States Patent
DiCarlo (10) Patent No.: US 7,830,429 B1
(45) Date of Patent: Nov. 9, 2010

(54) OPTIMIZING CHARACTERIZATION VALUES OF IMAGE CAPTURE APPARATUS COMPONENTS

(75) Inventor: Jeffrey M. DiCarlo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 601 days.

(21) Appl. No.: 11/829,233

(22) Filed: Jul. 27, 2007

(51) Int. Cl.
*H04N 5/335* (2006.01)
*G06K 9/00* (2006.01)

(52) U.S. Cl. .................................. 348/273; 382/162
(58) Field of Classification Search ............ 348/207.99, 348/222.1, 223, 231, 273; 382/162, 165, 382/167, 224, 274; 358/474, 483
See application file for complete search history.

(56) References Cited

U.S. PATENT DOCUMENTS

| | | | |
|---|---|---|---|
| 5,898,509 A | | 4/1999 | Bianchi et al. |
| 6,023,525 A | * | 2/2000 | Cass .......................... 382/162 |
| 6,459,449 B1 | * | 10/2002 | Juen ........................ 348/223.1 |
| 6,954,547 B2 | * | 10/2005 | Matsushiro et al. ......... 382/162 |
| 6,985,622 B2 | | 1/2006 | Hubel |
| 7,053,935 B2 | * | 5/2006 | Guimaraes et al. ....... 348/222.1 |
| 7,072,511 B2 | | 7/2006 | Tan et al. |
| 7,173,657 B2 | * | 2/2007 | Katoh et al. ................ 348/273 |
| 7,236,195 B2 | * | 6/2007 | Quan et al. ................. 348/273 |

\* cited by examiner

*Primary Examiner*—David L Ometz
*Assistant Examiner*—Trung Diep (57) ABSTRACT

In a method for identifying substantially optimized characterization values of one or more components in an image capture apparatus a set of characterization values for the components is selected and responses and noise distributions of the sensor are modeled based upon the values contained in the set of the characterization values. The modeled responses and noise distributions are propagated through the image processing pipeline and a risk number associated with the selected set of characterization values from the propagated responses and noise distributions is obtained. In addition, substantially optimized characterization values of the one or more components are identified by substantially minimizing the risk number.

20 Claims, 6 Drawing Sheets

OPTIMIZING CHARACTERIZATION VALUES OF IMAGE CAPTURE APPARATUS COMPONENTS

BACKGROUND

Accurate color rendering of original images is an important criterion for digital imaging devices, such as, digital cameras, scanners, photocopiers, facsimile machines, and multipurpose machines. Inaccurate color rendering is known to cause colors that are different in the original images to appear the same in the rendered images and to also cause colors that are similar in the original images to appear different in the rendered images. Therefore, rendering digitally captured images such that they accurately match the colors in the original images is critical to providing visually accurate digital reproductions of the original images.

The color accuracy of a digital imaging device depends on a number of hardware and software components contained in the digital imaging device. Some of the more critical components include filters, image sensors, illuminants, and color correction computations. The color correction computations typically include the use of look-up tables, non-linear functions or linear matrix techniques, to modify the raw color signals, for instance, RGB signals, of the capture images to create a more accurate reproduction of the capture images.

The components of conventional digital imaging devices are selected to maximize color accuracy without regard to the noise in the digital imaging devices. This approach is typically suitable for digital imaging devices having only three channels, where the three channels are not highly correlated, and where the image sensor has a good-signal-to noise ratio. However, if any of these conditions is not met, maximizing the color accuracy will cause the noise in the digital imaging devices to be greatly amplified.

The noise is amplified because light is formed of photons that arrive at the sensors at discrete intervals of time instead of continuously, and light therefore fundamentally includes noise. Measurement of the light leads to a noise source referred to as shot noise. Shot noise at each color sensor is independent and uncorrelated to all the other color sensors. Therefore, when the raw color signal from a sensor is computed with the color correction, the shot noise is amplified by coefficients contained in the computation. Larger coefficients generally lead to larger noise amplification and result when either the imaging device has more than three-channels or the three-channels are highly spectrally correlated, and the coefficients are designed to maximize accuracy. Therefore, maximizing color accuracy also has the undesirable side effect of maximizing color noise.

An improved approach to designing and constructing digital imaging devices that do not suffer from the drawbacks associated with conventional digital imaging devices discussed above would therefore be beneficial, particularly for imaging devices configured to process more than three channels of information.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for identifying substantially optimized characterization values for one or more components in an image capture apparatus. The identified characterization values are configured to substantially optimize the trade-off between enhanced color accuracy and increased color noise levels. In other words, the characterization values identified through execution of the method disclosed herein are intended to substantially balance color accuracy with color noise in the image capture apparatus. As such, the method disclosed herein may be implemented to design the filters, illuminants, sensors, and color correction matrices contained image capture apparatuses to substantially optimize the fundamental tradeoff between color accuracy and noise.

Through implementation of the method disclosed herein, a user may relatively quickly and easily determine how a design decision affects the resulting color accuracy and color noise levels of the image capture apparatus. For example, if the user had to choose between two different image sensors for the image capture apparatus, the user may select characterization values for the two different image sensors and execute the method disclosed herein to determine risk numbers resulting from the different characterization values. The user may then select the image sensor yielding the lowest risk number to be used in the image capture apparatus.

Figure 1:
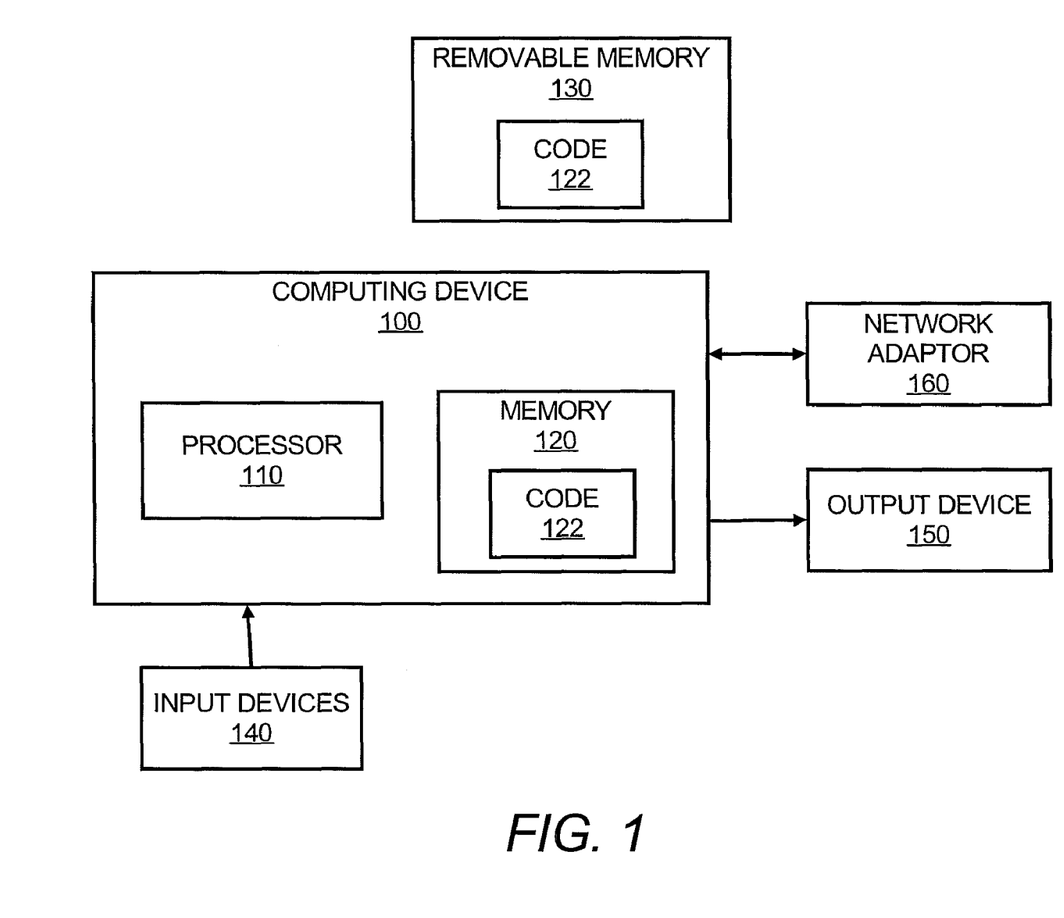
FIG. 1 shows a simplified block diagram of a computing device configured to perform various functions described herein, according to an embodiment of the invention.

With reference first to FIG. 1, there is shown a simplified block diagram of a computing device 100 configured to perform various functions described herein, according to an example. It should be understood that the following description of the computing device 100 is but one manner of a variety of different manners in which the computing device 100 may be configured.

The computing device 100 comprises a personal computer, a laptop computer, a server, a personal digital assistant, etc. As shown, the computing device 100 includes a processor 110 that executes one or more programs configured to automatically identify characterization values for one or more components in an image capture apparatus 300, 300' (FIGS. 3A and 3B) that substantially optimize the trade-off between enhanced color accuracy and increased color noise levels, as discussed in greater detail herein below. The one or more programs may be stored as code 122 in a memory 120, such as, a random access memory (RAM), of the computing device 100, where program code for the processor 110 may be run during runtime.

Alternatively, the one or more programs may be stored as code 122 in a removable memory 130, such as, a compact disk, a DVD, a flash memory device, a magnetic disk, a magnetic tape device, etc. In this instance, the computing device 100 may be equipped with one or more drives for reading the code 122 from the removable memory 130.

As also shown in FIG. 1, the computing device 100 may be connected to user input devices 140 and output devices 150. The user input devices 140 may include a keyboard, a mouse, a stylus, etc., and the user output device 150 may include a display, a printer, etc. In addition, the processor 110 may communicate over a network, for instance, the Internet, LAN, etc., through a network adaptor 160.

Figure 2:
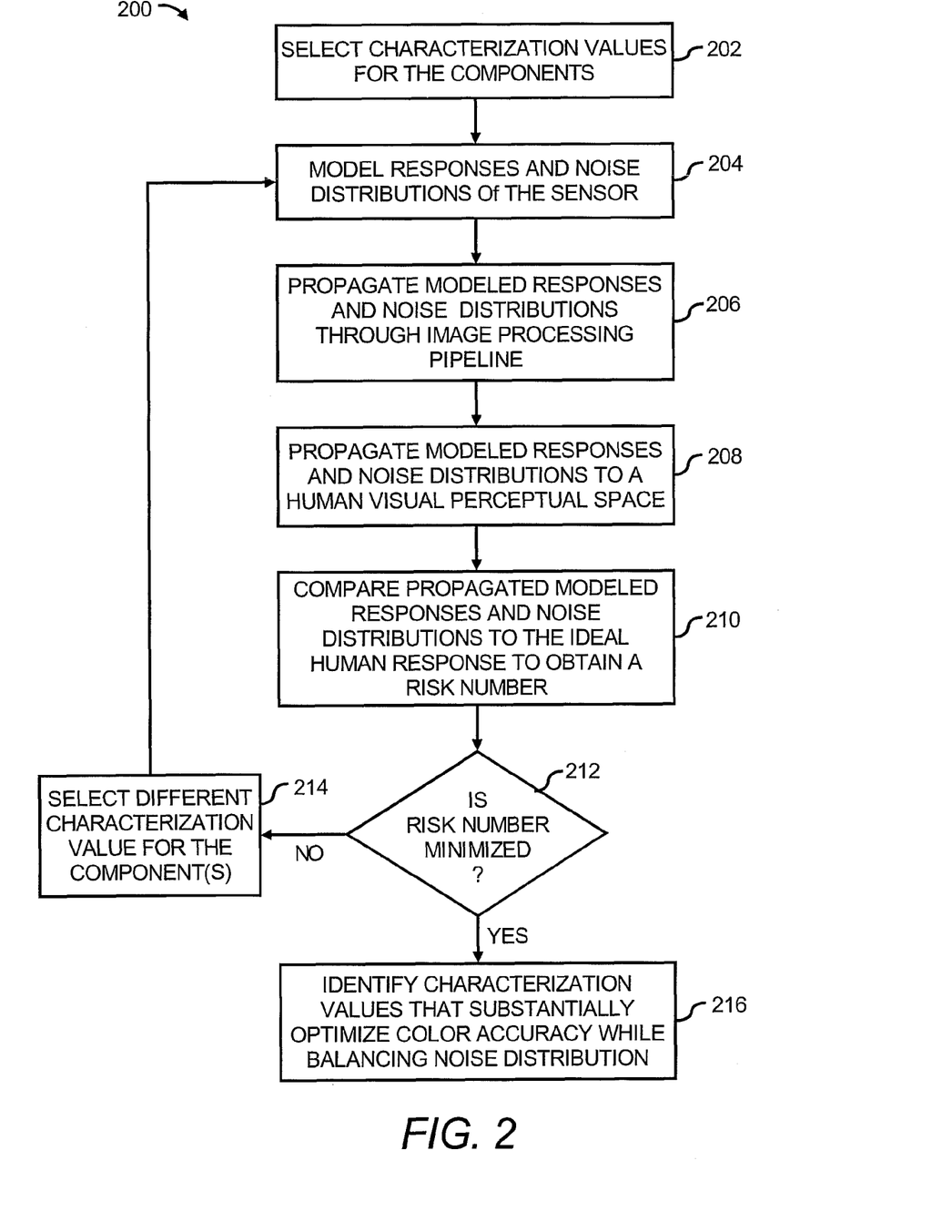
FIG. 2 shows a flow diagram of a method for identifying substantially optimized characterization values for one or more components in an image capture apparatus, according to an embodiment of the invention.

Some of the operations performed by the processor 110 in executing the code 122 are depicted and described with respect to the flow diagram illustrated in FIG. 2.

FIG. 2, more particularly, depicts a flow diagram of a method 200 for identifying substantially optimized characterization values for one or more components in an image capture apparatus 300, 300', according to an example. It should be understood that the following description of the method 200 is but one manner of a variety of different manners in which such a method 200 may be implemented. In addition, it should be understood that the method 200 may include additional steps and that some of the steps described herein may be removed and/or modified without departing from a scope of the method 200.

Figure 3A:
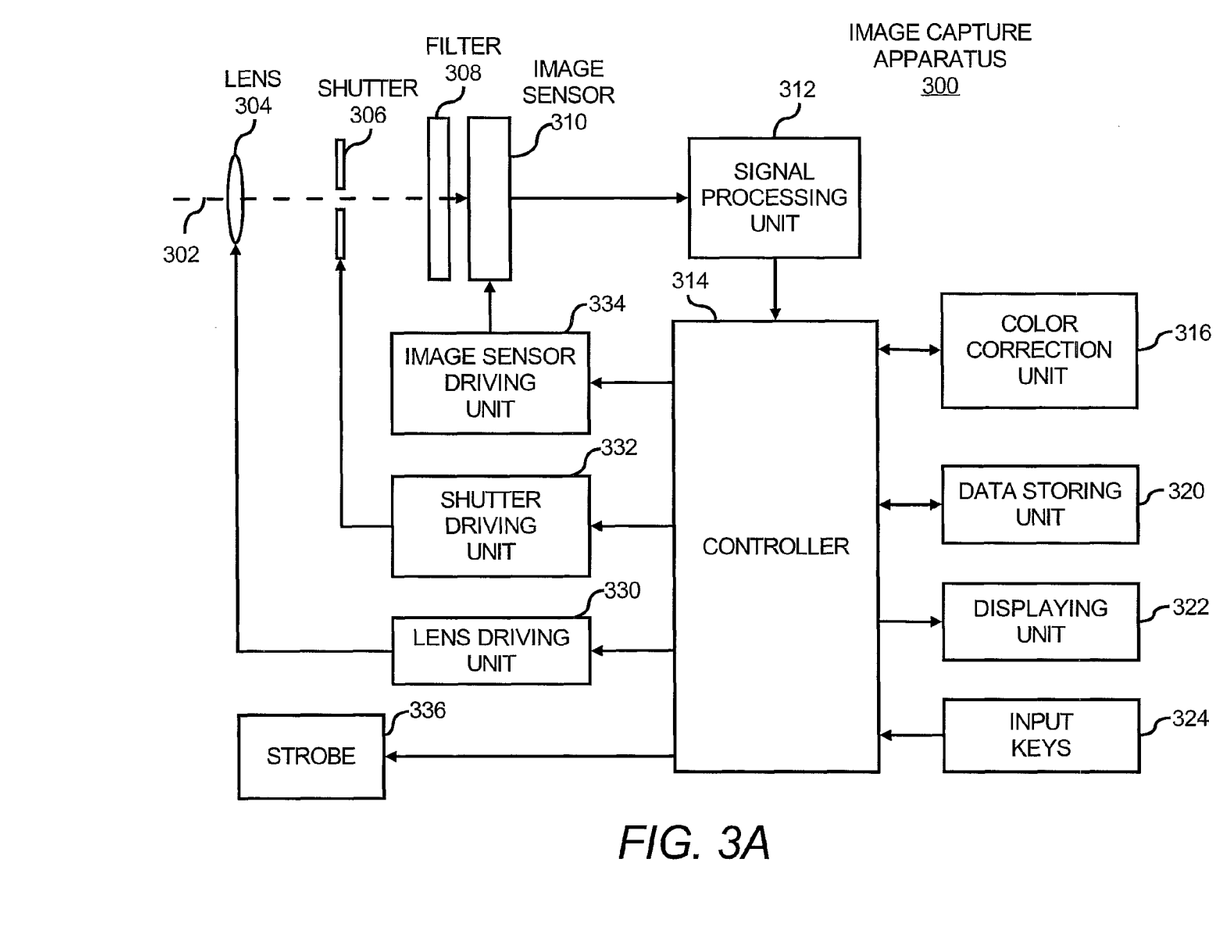
FIGS. 3A and 3B, respectively, depict image capture apparatuses which have components that have been selected through implementation of the flow diagram shown in FIG. 2, according to an embodiment of the invention.
Figure 3B:
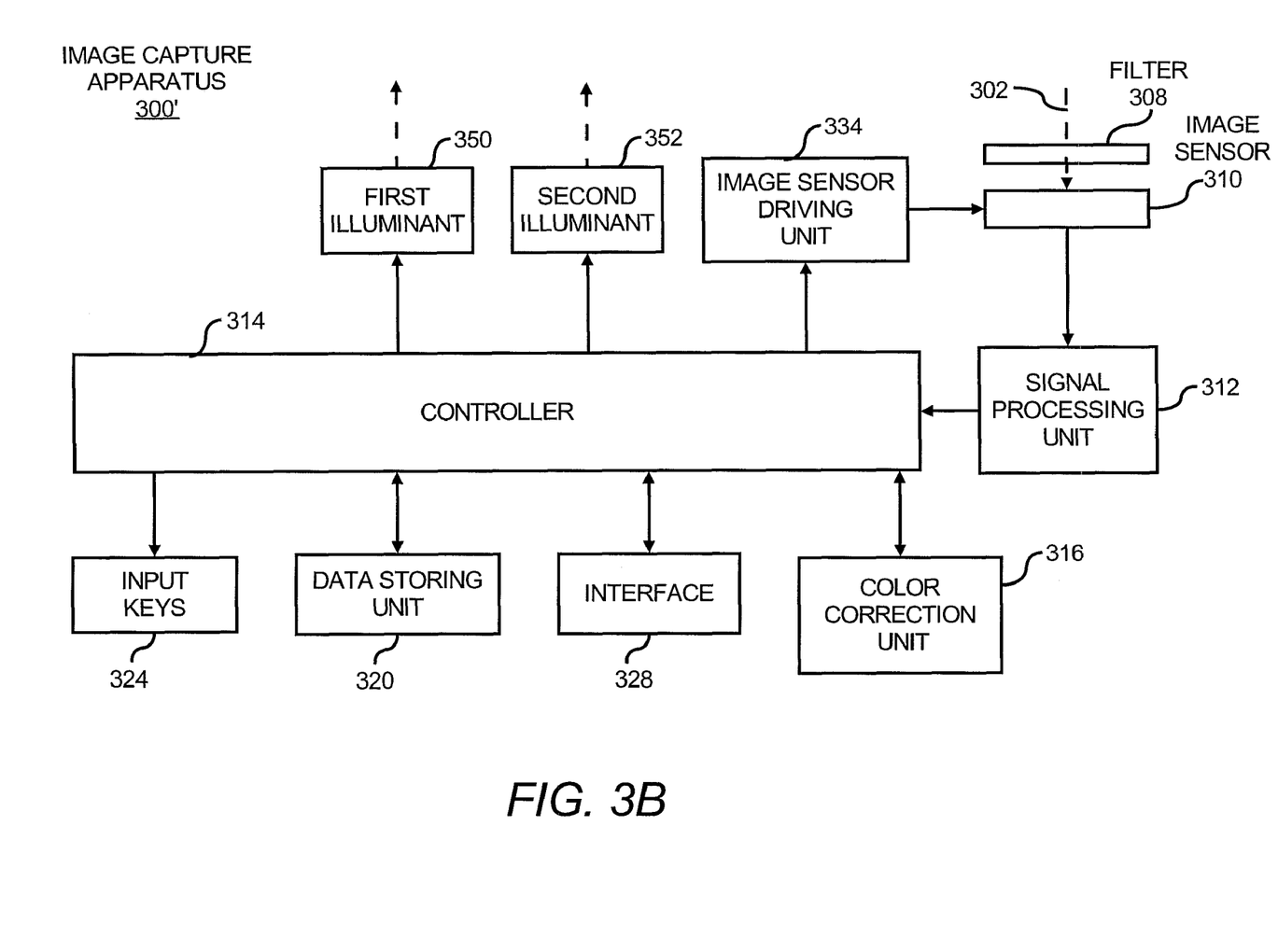

The description of the method 200 is made with reference to FIGS. 3A and 3B, which respectively depict simplified block diagrams of image capture apparatuses 300, 300', according to two examples, in which the method 200 is performed to identify characterization values of at least one of the components contained in the image capture apparatuses 300, 300'. The image capture apparatus 300 comprises a digital camera and the image capture apparatus 300' comprises a digital image scanner. Although particular reference is made to the elements depicted in FIGS. 3A and 3B, it should be understood that the method 200 may be performed to identify characterization values of at least one component of a differently configured image capture apparatus, without departing from a scope of the method 200.

Generally speaking, the processor 110 may execute the method 200 to identify combinations of hardware/software components for the image capture apparatus 300, 300' that reproduces color most accurately in terms of human visual perception, while balancing increases in color noise levels. In addition, the processor 110 may execute the method 200 during an initial design phase of an image capture apparatus 300, 300' or to substantially re-design an existing image capture apparatus 300, 300'.

The image capture apparatus 300 may comprise a digital still camera, a digital video camera, or a combination thereof, a digital device, such as, a cellular telephone containing a digital camera, etc. As shown, the image capture apparatus 300 includes a lens 304 through which object light 302 is received into the image capture apparatus 300. The object light 302 passes through a shutter 306 and a filter array 308 prior to reaching an image sensor 310. The filter array 308 is composed of a plurality of differently colored filters arranged in a pattern, such as a Bayer pattern. The number of filters contained in the filter array 308 determines the number of color channels that the image capture apparatus 300, 300' is configured to process. Thus, a filter array 308 having three filters will enable the image capture apparatus 300, 300' to process three channels of color.

However, in instances where the image capture apparatus 300, 300' includes three or more image sensors 310, the image capture apparatus 300, 300' may include three or more filter arrays 308, where each of the filter arrays is associated with a respective image sensor 310. In this example, each of the filter arrays 308 may comprise a single color and may comprise different colors from each other. In this example, the image capture apparatus 300, 300' may include a beam splitter (not shown) to direct identical amounts of light 302 to each of the image sensors 310. Thus, although particular reference is made throughout the present disclosure of the filter array 308 having different filters, it should be understood that these descriptions are applicable to image capture apparatuses 300, 300' having multiple filter arrays 308 and image sensors 310.

In any regard, the image sensor 310 comprises a charge coupled device (CCD) image sensor or a complimentary metal-oxide semiconductor (CMOS) image sensor. The image sensor 310 generally operates to convert the object light 302 into electrical signals, which are proportional to the optical energy of the object light 302. In addition, the image sensor 310 is configured to input the electrical signals into a signal processing unit 312, which generally performs signal processing, such as formation of luminance signals and color signals, on the input electrical signals. The signal processing unit 312 may also perform gamma correction, compression, and the like, on the input electrical signals.

The electrical signals processed by the signal processing unit 312 are inputted into a controller 314. The controller 314 may comprise any reasonably suitable processing device configured to perform various functions in the image capture apparatus 300. By way of example, the controller 312 may comprise a microprocessor, a micro-controller, an application specific integrated circuit (ASIC), or other suitable device capable of performing various functions in the image capture apparatus 300.

The controller 314 implements or invokes a color correction unit 316 to correct the colors contained in the electrical signals. The color correction unit 316 may apply at least one of a color correction matrix, a look-up table, a non-linear function, etc., to the electrical signals because the spectral sensitivity functions of the image sensor 310 deviate from the desired target color space. In other words, the color correction unit 316 converts the electrical signals into a more accurate reproduction of the original colors received by the image sensor 310.

When the image sensor 310 is configured to receive more than three-channels of information, the color correction unit 316 may be designed and applied to bring the information down to three channels by taking proportions of each channel and using sub-portions of each channel to form the three-channels of information into a more accurate reproduction of the colors contained in the original image.

The controller 314 may store the color corrected image in a data storing unit 320, which may comprise, for instance, a removable memory device. The controller 314 may also display the color corrected image on a displaying unit 322. In addition, the controller 314 may receive input from input keys 324.

The controller 314 may optionally operate a lens driving unit 330 to vary the focal length of the object light 102 captured by the image sensor 310, for instance, under an auto-focusing operation. The controller 112 may also operate a shutter driving unit 332, an image sensor driving unit 334, and a strobe 136.

The image capture apparatus 300' depicted in FIG. 3B may comprise a scanner or a scanning portion of a photocopier, a facsimile machine, etc. As shown, the image capture apparatus 300' includes many of the same elements depicted in FIG. 3A, and thus, only those elements that differ will be described with respect to FIG. 3B.

Initially, the image capture apparatus 300' includes an interface 328 through which scanned images may be transferred to a computing device, a printer, a facsimile machine, a multipurpose machine, etc. The image capture apparatus 300' is depicted as including a first illuminant 350 and an optional second illuminant 352. The first illuminant 350 and the second illuminant 352 contain different phosphors and are thus configured to emit light having different characteristics. As such, the image sensor 310 may receive color data when the first illuminant 350 is active and may receive color data when the second illuminant 352 is active to thereby receive, for instance, six channels of color data. The second illuminant 352 is considered optional because the second illuminant 352 may be omitted for image capture apparatuses 300' designed to process three channels of information.

With reference back to FIG. 2, the components of the image capture apparatus 300, 300' that may be identified through execution of the method 200 include hardware components, such as, the filter array 308, the sensor 310, and the illuminants 350 and 352, and software components, such as, the software that may be included in the color correction unit 316.

Once the method is initiated, for instance, the processor 110 may select characterization values for one or more of the components, as indicated at step 202. With respect first to the filter array 308, the characterization values of each of the filters contained in the filter array 308 may be selected to characterize a relative responsivity for various wavelengths of light. For instance, if the filter array 308 contains four filters, the processor 110 may select characterization values for each of the four filters. In one example, the processor 110 may randomly select the characterization values for each of the filters. In another example, the filter array 308 may have been pre-selected and thus, the characterization values for each of the filters may also have been pre-selected.

With respect to the illuminants 350, 352, the characterization values may be selected to characterize desired spectral power distributions of the illuminant 350, 352. As an example, the characterization values may be based upon various phosphors that are available for use in the illuminants 350, 352. In one example, the processor 110 may randomly select the characterization values for either or both of the illuminants 350, 352. In another example, the phosphors contained in either or both of the illuminants 350, 352 may have been pre-selected and thus, the characterization values for either or both of the illuminants 350, 352 may have also been pre-selected.

With respect to the image sensor 310, the characterization values may be selected based upon the spectral responsivity of the image sensor 310. Again, the characterization values of the image sensor 310 may be selected randomly or based upon known image sensor 310 characterization values, which may be pre-selected according to, for instance, readily available image sensors 310.

With respect to the color correction unit 316, the characterization values may be based upon the values contained in one or more of the color correction matrix, a look-up table, a non-linear function, etc., of the color correction unit 316. In one example, the color correction matrix is generally composed of values arranged in a matrix having a size equal to three elements (number of display primary colors) by the number of filters (or color channels). The color correction matrix generally operates to convert, for instance, four channels of color information to three channels, which is necessary for most displays. In addition, the color correction matrix is operable to convert the color data received by the image sensor 310 to a relatively more accurate reproduction of the original image in a human perceptual sense.

The look-up table may contain a table of values that specify how sensor responses are converted to perceptual values like CIELab values. More specifically, for instance, the table may specify a different CIELab value for every possible sensor response value. The table may also specify a relationship between only some sensor response values and CIELab values, and linear interpolation may be used to determine sensor response values that are not included in the table.

The non-linear function generally refers to a functional formula that describes the relationship between sensor responses and human perceptual values. The non-linear function may be similar to the color correction matrix, which is a linear function, but may also include non-linear terms, such as, squared exponents.

In any regard, at step 202, the processor 110 may randomly select the characterization values to be employed by the color correction unit 316. Alternatively, however, the characterization values may be pre-selected, for instance, in situations where only the identity of the phosphor to be used in the second illuminant 352 is desired.

As discussed above, the processor 110 may randomly select one or more of the characterization values at step 202. In this example, the processor 110 may randomly select characterization values for those components that have not been pre-selected. Thus, for instance, the processor 110 may randomly select a characterization value for the second illuminant 352 while receiving a characterization value for at least one of a pre-selected first illuminant 350, a pre-selected sensor 310, and a pre-selected filter array 308. In another example, the processor 110 may randomly select starting characterization values for the color correction matrix 317 and may receive pre-selected characterization values for the illuminants 350, 352, the sensor 310, and the filter array 308. As such, the characterization values may comprise any combination of pre-selected and unknown characterization values.

At step 204, the processor 110 models the response and noise distribution of the image sensor 310 based on either or both of the pre-selected and randomly selected characterization values of the sensor 310, the filter 308, and a set of standard input sources. If the image capture apparatus 300' comprises a scanner, the processor 110 also bases the response and noise distribution models on the characterization values of either or both of the illuminants 350 and 352. According to an example, the processor 110 may use the image formation equation to model the response of the image sensor 310 for each input source. Generally speaking, the image formation equation describes the relationship between an object and corresponding sensor responses in terms of an optical system-transfer function.

An example of a suitable image formation equation is:

$$\rho_j = \alpha \int_\lambda S_j(\lambda) E(\lambda) R(\lambda) d\lambda. \quad \text{Equation (1)}$$

In Equation (1), $\rho_j$ is equal to the $j^{th}$ sensor response, $\alpha$ is a gain factor due to exposure, aperture and lighting geometry, $S_j(\lambda)$ is the $j^{th}$ sensor responsivity function, $E(\lambda)$ is the illuminant spectral power distribution, and $R(\lambda)$ is the surface reflectance function.

The standard input sources generally comprise likely surfaces and likely illuminants that exist in the world. As the names suggest, "likely surfaces" and "likely illuminants" are examples of those surfaces and illuminants that the image capture apparatus 300, 300' is likely to encounter. By way of example, the "likely surfaces" may include human skin, sky colors, water colors, plant colors, building colors, etc. In addition, the "likely illuminants" may include sun light, fluorescent light, tungsten light, etc. As such, at step 204, the processor 110 models, for instance, the expected results that the image sensor 310 would have for a variety of likely surfaces and illuminants.

Figure 4A:
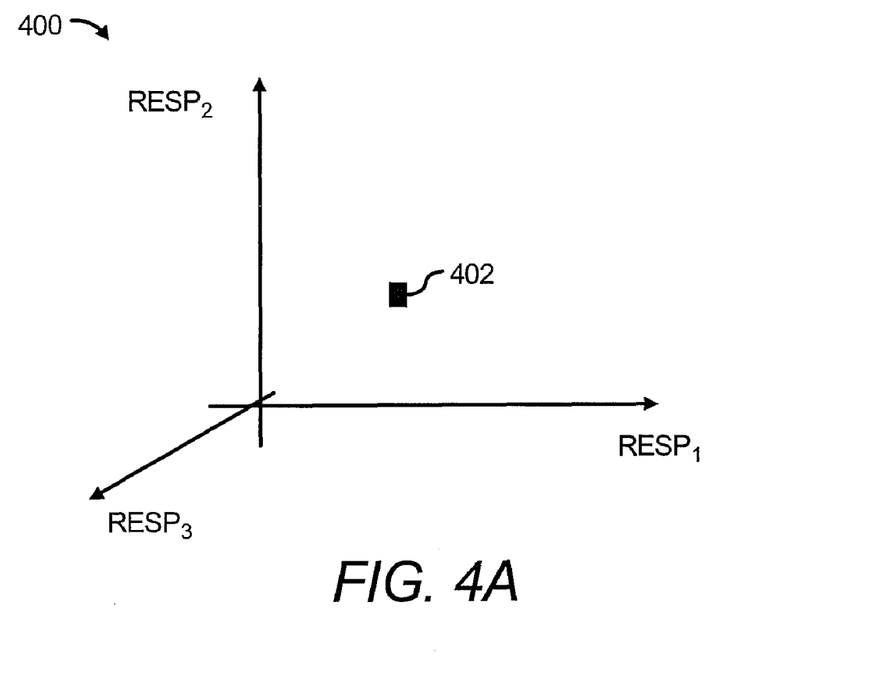
FIG. 4A shows a sensor space graph depicting an example of a sensor response position for a particular surface and illuminant combination, according to an embodiment of the invention.

In either case, the image sensor response 402 to a particular surface and illuminant combination may comprise a certain RGB value, six-channel color value, etc., as depicted in the sensor space graph 400 in FIG. 4A. FIG. 4A, more particularly, depicts an example of a sensor response 402 in three-dimensions, response 1, response 2, and response 3, which represent data pertaining to three color channels for a particular surface and illuminant combination. The position of the sensor response 402 would therefore differ for different surface and illuminant combinations and the processor 110 is configured to model the sensor responses 402 for a number of the different combinations.

The processor 110 also models the noise associated with the sensor response 402 measurements at step 204. Generally speaking, the step of modeling the noise is equivalent to measuring the same surface and illuminant combination numerous times. However, instead of performing this measurement numerous times, the processor 110 is configured to model the noise distribution based upon known noise characteristics, such as shot noise, quantization noise, dark noise, read noise, etc. According to an example, however, the noise distribution of brighter regions may be modeled based upon the shot noise and darker regions may be modeled based upon the quantization or read noise because these are is known to be the dominant causes of noise in image capture apparatuses 300, 300'.

Figure 4B:
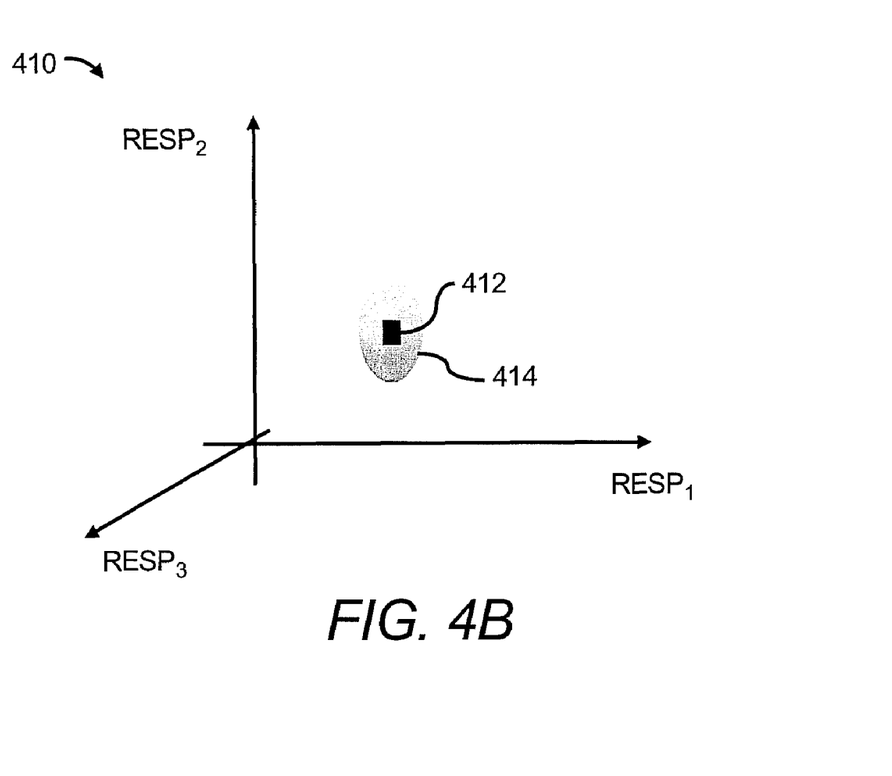
FIG. 4B shows a sensor space graph depicting an example of a sensor response position and a noise distribution for a particular surface and illuminant combination, according to an embodiment of the invention.

An example of the average sensor response 412 and its associated noise distribution 414 for a particular surface and illuminant combination is depicted in the sensor space graph 410 in FIG. 4B.

Although the processor 110 has been described as determining the noise distribution 414 associated with a sensor response 402 through use of a model, the processor 110 may also determine the noise distribution 414 by measuring the noise associated with numerous sensor responses 402. By way of example, the processor 110 may measure the noise by, for instance, capturing images of a color patch numerous times and determining the level of noise based upon differences in the captured images.

At this point, the processor 110 has determined the average response of each color sensor and the noise distribution measured by each color sensor for a given set of input sources and the pre-selected or randomly selected characterization values.

At step 206, the processor 110 may propagate each modeled sensor response 402 (average sensor response 412) and noise distribution 414 through the image processing pipeline of the image capture apparatus 300, 300'. The image processing pipeline includes the color correction unit 316 and may include other processes that affect the color data received by the sensor 310.

In other words, at step 206, the processor 110 applies at least one of the color correction matrix, the look-up table, the non-linear function, etc., of the color correction unit 316 to both the average sensor response 412 and the noise distribution 414 to bring the average sensor response 412 and the noise distribution to a more accurate reproduction of the originally received colors. Generally speaking, the noise distribution 414 identifies the probabilities associated with the sensor response 402 having a certain set of values, for instance, RGB values, six-color channel values, etc. The processor 110 applies the color correction unit 316 to transform the probabilities. More specifically, the color correction unit 316 moves the average sensor response 412 and the noise distribution 414. Some color correction units 316 will spread out the noise distribution 414, while other color correction units 316 will condense the noise distribution 414, depending upon the values contained in the color correction units 316.

Figure 5:
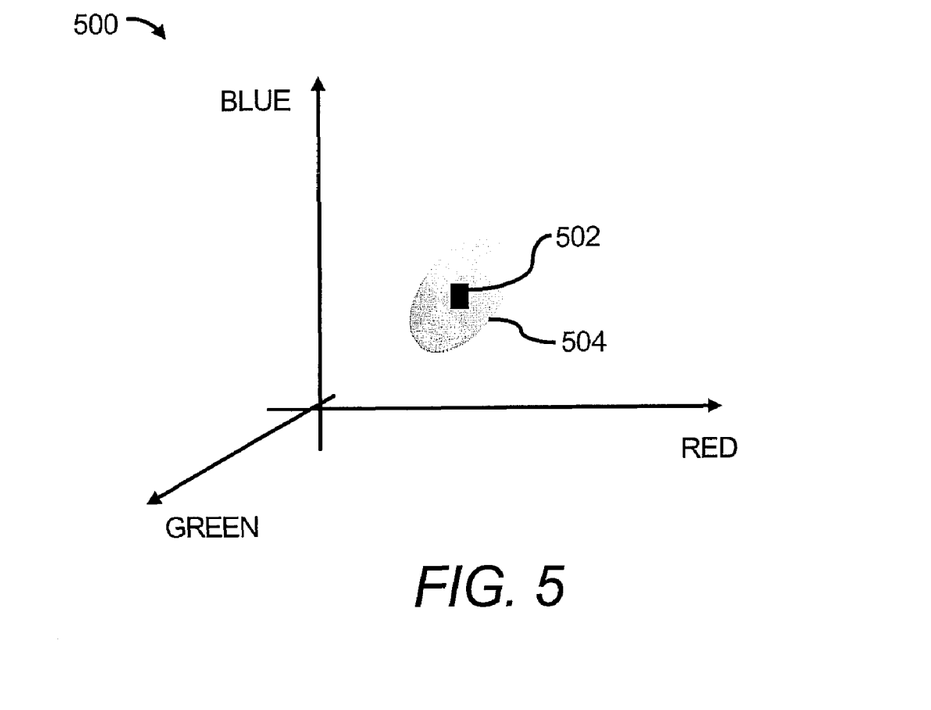
FIG. 5 shows a display space graph depicting an example of an average color and a noise distribution transformed from the sensor space graph depicted in FIG. 4B, according to an embodiment of the invention.

An example of the transformed average color 502 and the transformed noise distribution 504 is depicted in the display space graph 500 in FIG. 5. The average color 502 and the noise distribution 504 shown in the graph 500 is a simulation of how the image sensor 110 would have interpreted a particular surface/illuminant combination.

Figure 6:
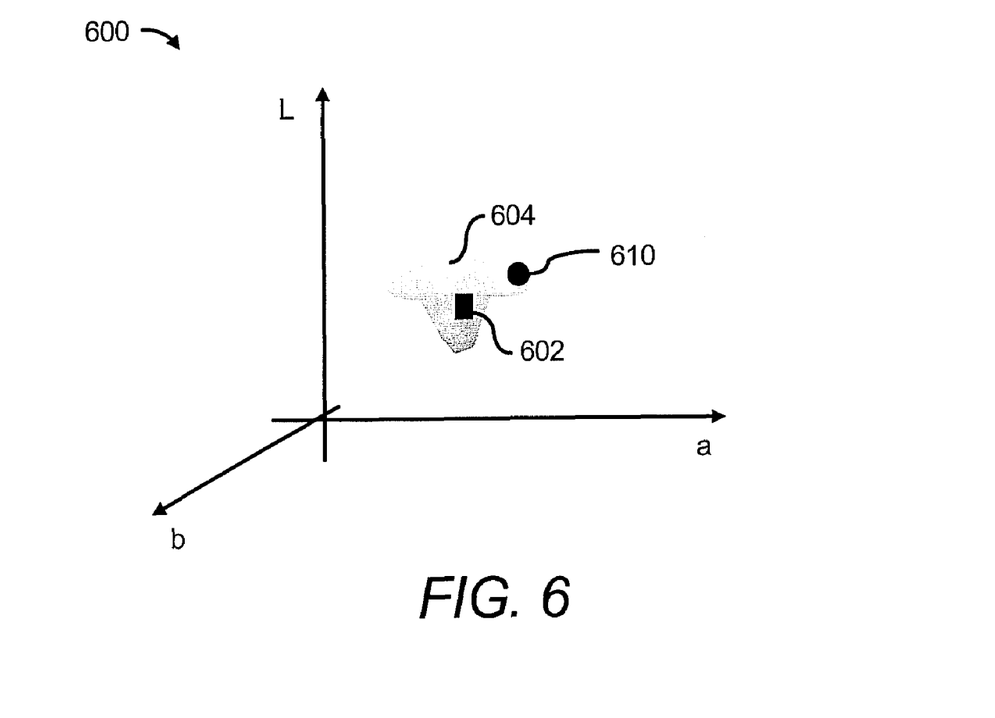
FIG. 6 shows a perceptual space graph depicting an example of an average color and a noise distribution transformed from the display space graph in FIG. 5, according to an embodiment of the invention.

At step 208, the processor 110 propagates the modeled responses and noise distributions to a human visual perceptual space. The processor 110 propagates the modeled responses by, for instance, transforming the average color 502 and the noise distribution 504 from the display space (FIG. 5) to any perceptual space, such as, CIELab, CIECAM, S CIELAB, etc. (FIG. 6). The processor 110 may transform the average color 502 and the noise distribution 504 through use of standard nonlinear mapping. A perceptual space graph 600 is depicted in FIG. 6, which shows an example of a transformed average color 602 and a transformed noise distribution 604.

At step 210, the processor 110 may compare the propagated modeled responses 602 and noise distributions 604 to the ideal human response to obtain a risk number. The risk number generally quantifies the expected color error based upon the modeled responses 602 and the modeled noise distributions 604. In other words, the risk number quantifies the probabilistic expectation that the color response will be equal to the ideal color.

The processor 110 may implement the following equation to calculate the risk number of the propagated responses 602 and noise distributions 604.

$$\text{risk number} = \sum_i \sum_x \Delta E^2(x, x_i) p(x|i). \quad \text{Equation (2)}$$

In Equation (2), the summation of "i" is the sum over the surfaces and illuminants used to model the responses and noise distributions of the image sensor 310 at step 204, the summation of "x" is the sum over the perceptual space, "$\Delta E^2$" is the human perceptual squared distance between a color 602 and the ideal color 610, "x" is a color 602, "$x_i$" is the ideal color 610, and "p(x|i)" is the noise distribution 604 that specifies the probability that a color x will occur given a surface/illuminant pair.

In addition, at step 212, the processor 110 may determine whether the risk number is minimized. During a first iteration of the method 200, the risk number may be relatively high, which indicates that the probability of accurately reproducing the colors in the original image is relatively low. As such, during the first iteration, the processor 110 may determine that the risk number has not been minimized at step 212. In addition, the processor 110 may select different characterization values for one or more of the components at step 214.

At step 214, more particularly, the processor 110 may select characterization values that differ from the ones selected at step 202 for the one or more components the processor 110 is allowed to vary. Thus, for instance, if the second illuminant 352 is being designed for an image capture apparatus 300' having a pre-selected filter array 308, a pre-selected first illuminant 350, and a pre-selected image sensor 310, the processor 110 may change the characterization values of the second illuminant 352 at step 214. In addition, the processor 110 may repeat steps 204-210 with the new characterization values.

As another example, if the color correction unit 316 is being designed for an image capture apparatus 300, 300' having a pre-selected filter array 308, a pre-selected sensor 310, and a pre-selected illuminant in the case of scanner, the processor 110 may select different characterization values solely for the color correction unit 316. In this example, the processor 110 may repeat steps 206-210 with the new characterization values for the color correction unit 316, while using the responses and noise distributions of the image sensor 310 modeled at step 204.

In any regard, at step 212, the processor 110 may determine whether the risk number calculated during the second iteration is lower than the risk number calculated during the first iteration. The processor 110 may repeat steps 204-214 until a minimized risk number is identified at step 212. Alternatively, however, the processor 110 may repeat steps 204-214 for a predetermined number of iterations, for a predetermined amount of time, until manually discontinued, etc. In this case, the processor 110 may determine which set of characterization values yielded the lowest risk number.

At the end of the iterations or when the risk number is determined to have been minimized, the processor 110 may identify the characterization values that yield the lowest risk number as the characterization values that substantially optimize color accuracy while balancing noise distribution in an image capture apparatus 300, 300', as indicated at step 216. Components having the selected characterization values may then be identified and the image capture apparatus 300, 300' may be constructed to include those components.

In a variation to the method 200, the processor 110 may initially select various different characterization values for one or more of the components at step 202 instead of selecting the different characterization values of one or more of the components at step 214 in response to the risk number not being minimized. In this example, the processor 110 may model responses and noise distributions resulting from each of the different characterization values at step 204, and may repeat steps 206 and 208 to determine which of the characterization value configurations or sets results in the lowest risk number at steps 210 and 212. Thus, in this example, the processor 110 may determine and compare the risk numbers associated with propagating the characterization values of the components as one process, instead of as an iterative process as depicted in FIG. 2.

The operations set forth in the method 200 may be contained as a utility, program, or subprogram, in any desired computer accessible medium. In addition, the method 200 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for identifying substantially optimized characterization values for one or more components in an image capture apparatus having an image sensor and an image processing pipeline, said method comprising:
   (a) selecting a set of characterization values for the components;
   (b) modeling responses and noise distributions of the sensor based upon the values contained in the set of the characterization values;
   (c) propagating the modeled responses and noise distributions through the image processing pipeline;
   (d) obtaining a risk number associated with the selected set of characterization values from the propagated responses and noise distributions, wherein the risk number quantifies a probabilistic expectation of color error; and
   (e) identifying substantially optimized characterization values of the one or more components by substantially minimizing the risk number.

2. The method according to claim 1, further comprising:
   (f) selecting different characterization values for at least one of the components;
   (g) repeating steps (b)-(d) with the different characterization values; and
   wherein step (e) further comprises determining whether the risk number resulting from the set of characterization values selected at step (a) is higher than the risk number resulting from the characterization values selected at step (f) and identifying the substantially optimized characterization values to equal the selected characterization values yielding the lowest risk number.

3. The method according to claim 2, further comprising:
iterating through steps (b)-(g) until a minimized risk number is identified to thereby identify characterization values for the one or more components that substantially balance color accuracy with color noise of the image capture apparatus.

4. The method according to claim 1, wherein the one or more components comprise the sensor, a filter, and a color correction unit of the image capture apparatus, and wherein step (a) further comprises randomly selecting characterization values for at least one of the sensor, filter, and color correction unit.

5. The method according to claim 1, wherein the one or more components comprise the sensor, a filter, an illuminant, and a color correction unit of the image capture apparatus, and wherein step (a) further comprises randomly selecting characterization values for at least one of the sensor, filter, illuminant, and color correction unit.

6. The method according to claim 5, wherein step (a) further comprises selecting predefined characterization values for the sensor, the filter, and the illuminant and randomly selecting characterization values for the color correction unit.

7. The method according to claim 1, wherein step (a) further comprises selecting at least one set of characterization values such that the at least one set of characterization values includes predefined characterization values for one or more of the components that have been pre-selected for the image capture apparatus.

8. The method according to claim 1, wherein step (c) further comprises applying at least one of a color correction matrix, a look-up table, and a non-linear function on the modeled responses and noise distributions to thereby predict a human color visualization response to the modeled responses and noise distributions.

9. The method according to claim 8, further comprising:
transforming the predicted human color visualization response to a perceptual color space through use of a nonlinear mapping technique.

10. The method according to claim 9, wherein step (d) further comprises implementing the following equation to determine the risk number:

$$\text{risk number} = \sum_i \sum_x \Delta E^2(x, x_i) p(x|i),$$

wherein the summation of "i" is the sum over surfaces and illuminants used to model the responses and noise distributions at step (b), the summation of "x" is the sum over the perceptual space, "$\Delta E^2$" is the human perceptual squared distance between a color determined from the responses modeled at step (b) and an ideal color, "x" is a color, "xi" is the ideal color, and "p(x|i)" is the modeled noise distribution that specifies the probability that a color "x" will occur given a surface/illuminant pair.

11. The method according to claim 1, wherein step (a) further comprises selecting multiple different sets of characterization values;
wherein step (b) further comprises modeling respective responses and noise distributions based upon the multiple different sets of characterization values;
wherein step (c) further comprises propagating the respective modeled responses and noise distributions;
wherein step (d) further comprises obtaining respective risk numbers associated with the respective multiple different sets of characterization values; and
wherein step (e) further comprises identifying which of the multiple different sets of characterization values yields the lowest risk number.

12. The method according to claim 1, wherein the image capture apparatus is configured to process more than three channels of color.

13. A method for identifying substantially optimized characterization values of at least one component in an image capture device comprising a sensor and an image processing pipeline, said method comprising:
(a) selecting first characterization values for the at least one component;
(b) selecting second characterization values for at least one other component in the image capture device;
(c) modeling responses and noise distributions of the sensor based upon the first characterization values and the second characterization values;
(d) propagating the modeled responses and noise distributions through the image processing pipeline;
(e) obtaining a risk number associated with the modeled responses and noise distributions, wherein the risk number quantifies a probabilistic expectation of color error;
(f) selecting third characterization values for the at least one component and repeating steps (b)-(e) to obtain another risk number; and
(g) determining which of the first characterization value and the third characterization value yields the lowest risk number.

14. The method according to claim 13, further comprising:
selecting additional characterization values for the at least one component;
repeating steps (b)-(g) with the additional characterization values; and
wherein step (g) further comprises determining which of the first characterization value, the third characterization value, and the additional characterization values yields the lowest risk number.

15. The method according to claim 13, wherein the at least one component comprises a color correction unit of the image capture apparatus and step (a) further comprises randomly selecting values for the color correction unit, and wherein step (d) further comprises applying the color correction unit to the responses and noise distributions modeled at step (c).

16. The method according to claim 13, wherein the image capture apparatus is configured to process at least four channels of color information and wherein the at least one component comprises an illuminant for the image capture apparatus, said step (b) further comprising selecting characterization values associated with phosphors for use in the illuminant.

17. The method according to claim 13, wherein step (e) further comprises applying at least one of a color correction matrix, a look-up table, and a non-linear function on the modeled responses and noise distributions to thereby predict a human color visualization response to the modeled responses and noise distributions.

18. The method according to claim 17, further comprising:
transforming the predicted human color visualization response to a perceptual color space through use of a nonlinear mapping technique; and
wherein step (e) further comprises implementing the following equation to determine the risk number:
risk number, wherein the summation of "i" is the sum over surfaces and illuminants used to model the responses and noise distributions at step (b), the summation of "x" is the sum over the perceptual space, "$\Delta E2$" is the human perceptual squared distance between a color determined from the responses modeled at step (b) and an original color, "x" is a color, "xi" is the ideal color, and "p(x|i)" is the modeled noise distribution that specifies the probability that a color "x" will occur given a surface/illuminant pair.

19. A non-transitory computer readable storage medium on which is embedded one or more computer programs, said one or more computer programs implementing a method for identifying substantially optimized characterization values of one or more components in an image capture apparatus having an image sensor and an image processing pipeline, said one or more computer programs comprising computer readable code for:
(a) selecting a set of characterization values for the components;
(b) modeling responses and noise distributions of the sensor based upon the values contained in the set of the characterization values;
(c) propagating the modeled responses and noise distributions through the image processing pipeline;
(d) obtaining a risk number associated with the selected set of characterization values from the propagated responses and noise distributions, wherein the risk number quantifies a probabilistic expectation of color error; and
(e) identifying substantially optimized characterization values of the one or more components by substantially minimizing the risk number.

20. The computer readable storage medium according to claim 19, said one or more computer programs further comprising computer readable code for:
(f) selecting different characterization values for at least one of the components;
(g) repeating steps (b)-(d) with the different characterization values; and
wherein step (e) further comprises determining whether the risk number resulting from the set of characterization values selected at step (a) is higher than the risk number resulting from the characterization values selected at step (f) and identifying the substantially optimized characterization values to equal the selected characterization values yielding the lowest risk number.

* * * * *

UNITED STATES PATENT AND TRADEMARK OFFICE
CERTIFICATE OF CORRECTION

| | | |
|---|---|---|
| PATENT NO. | : 7,830,429 B1 | Page 1 of 1 |
| APPLICATION NO. | : 11/829233 | |
| DATED | : November 9, 2010 | |
| INVENTOR(S) | : Jeffrey M. DiCarlo | |

It is certified that error appears in the above-identified patent and that said Letters Patent is hereby corrected as shown below:

In column 11, line 53, in Claim 10, delete ""xi"" and insert -- "$x_i$" --, therefor.

In column 12, line 63, in Claim 18, delete "risk number," and insert

-- risk number = $\sum_i \sum_x \Delta E^2(x_\gamma, x_i) p(x|i)$, --, therefor.

In column 12, line 66, in Claim 18, delete ""ΔE2"" and insert -- "$\Delta E^2$" --, therefor.

In column 13, line 2, in Claim 18, delete ""xi"" and insert -- "$x_i$" --, therefor.

Signed and Sealed this
Twenty-second Day of March, 2011

David J. Kappos
*Director of the United States Patent and Trademark Office*